Patented Nov. 11, 1924.

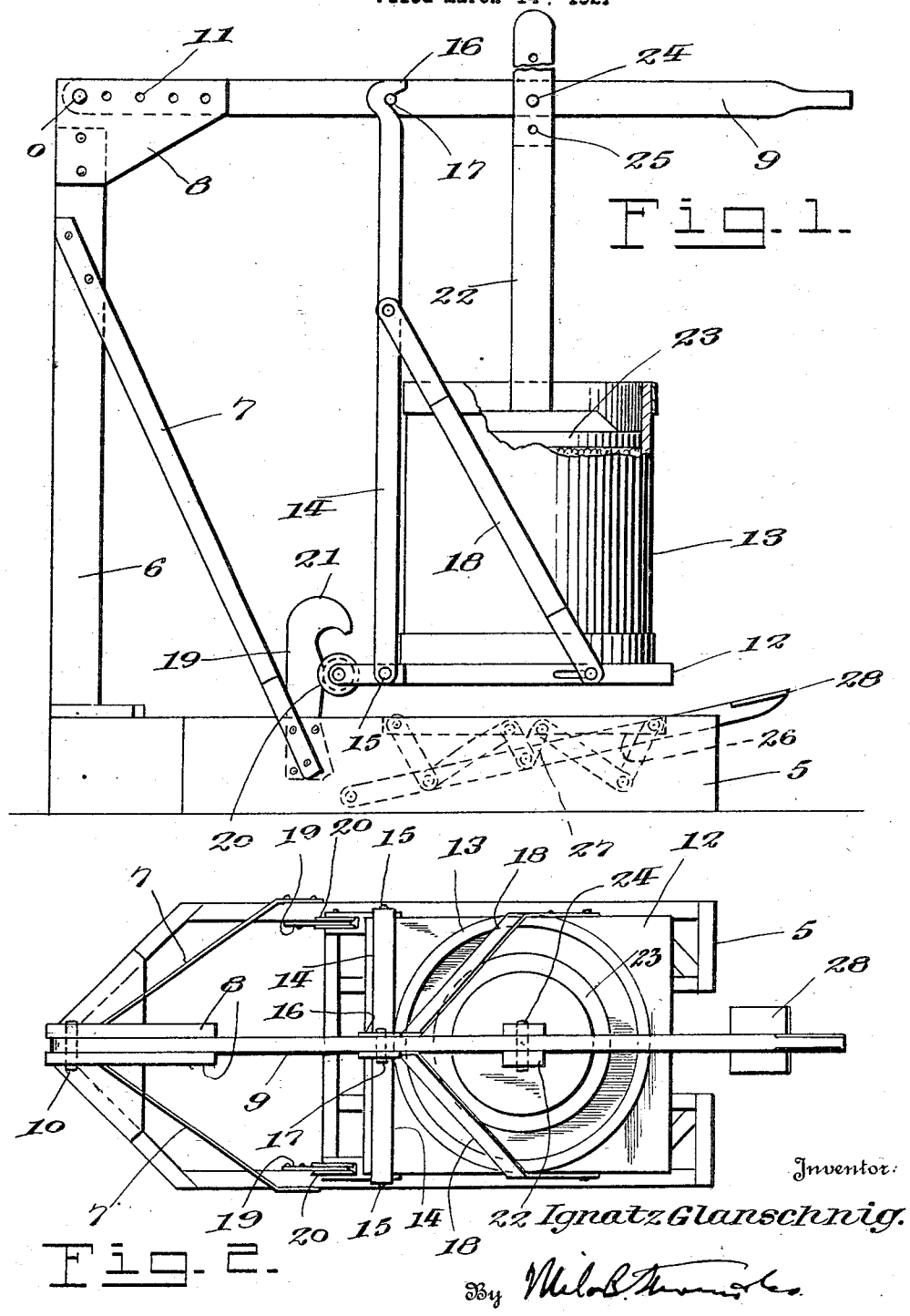

1,514,761

UNITED STATES PATENT OFFICE.

IGNATZ GLANSCHNIG, OF GARY, INDIANA, ASSIGNOR OF ONE-HALF TO FREDERICK E. HUMMEL, OF CHICAGO, ILLINOIS.

KRAUT PRESS.

Application filed March 14, 1921. Serial No. 451,982.

*To all whom it may concern:*

Be it known that I, IGNATZ GLANSCHNIG, a subject of Austria, residing at Gary, in the county of Lake and State of Indiana, have invented new and useful Improvements in Kraut Presses, of which the following is a specification.

This invention relates to presses employed for holding sauerkraut pressed down and submerged in the brine, and its object is to provide a novel and improved device of this kind in which the necessary pressure is obtained by the weight of the kraut and brine, and the receptacle containing the same.

The object stated is attained by means of a combination and arrangement of parts to be hereinafter described and claimed, and in order that the same may be better understood, reference is had to the accompanying drawing forming a part of this specification.

In the drawing,

Figure 1 is a side-elevation of the apparatus and Fig. 2 is a plan view thereof.

Referring specifically to the drawing, 5 denotes a suitable base one end of which supports an upright post 6, firmly braced as shown at 7, and carrying at the top a bracket 8 to which is fulcrumed one end of a lever 9 in such a manner that said lever is free to swing in a vertical direction. The fulcrum of the lever is a cross pin 10 passing through one of a series of apertures 11 in the bracket 8, said apertures running in the direction of the length of the lever so as to enable the latter to be adjusted longitudinally.

The lever 9 carries a platform 12 on which seats the barrel or other receptacle 13 containing the kraut to be pressed. This support of the receptacle is suspended from the lever 9 by a pair of links 14 which are loosely connected at their lower ends to the platform, as shown at 15, and have their upper ends provided with hooks 16 whereby they are hung on a cross pin 17 carried by the lever and projecting from opposite sides of the latter. Brace links 18 extend diagonally between the platform 12 and the links 14 to maintain the former in horizontal position for supporting the receptacle.

To the rear of the platform 12, the base 5 carries upstanding abutments 19 against which bear rollers 20 carried by the rear edge of the platform. These rollers ride up and down on the forward edges of the abutments, and the latter have hook-shaped upper ends 21 to limit the upward travel of the rollers and the corresponding movement of the platform. The purpose of the abutments and the rollers is to constrain the platform to travel downwardly in a straight line. It will be evident that the links 14 cannot swing rearwardly, or in the direction of the abutments, and hence they remain hanging straight down when the lever 9 swings down to lower the platform, and as a consequence, the platform remains horizontal and moves downwardly in a straight line.

Ahead of the links 14, the lever 9 carries the stem 22 of a plunger 23, which latter is adapted to enter the receptacle 13 and press down on the contents thereof. The connection between the lever and the plunger stem is made by a cross pin 24 passing through said parts, the stem having a plurality of apertures 25 to permit vertical adjustment of the plunger.

The operation of the device may be summarized as follows:

The lever 9 is swung upwardly to the extent it is limited by the hooks 21, and it is held elevated while the receptacle 13 is placed on the platform 12. The plunger 23 is then inserted into the receptacle to seat on top of the contents thereof, and the plunger stem 22 is coupled to the lever 9. If now the lever 9 is released it will be caused to swing downwardly by the weight of the parts it carries, and as the plunger stem 22 is coupled to the lever 9 at a point which is more remote from the fulcrum 10 than the point where the links 14 are connected to the lever, it will be evident that the platform 12 and the receptacle 13 do not move downwardly as far as the plunger 23 at the same time. The greater downward movement of the plunger relative to the receptacle causes the plunger to press down on top of the contents of the latter, with more or less force, the same depending on the weight of the receptacle and its contents. The greater the weight the greater will be the pressure. The parts can move downwardly in the manner stated as long as the plunger can compress the contents of the receptacle, and when the compression has reached such a degree that a further downward movement of the plunger is not possible, the entire mechanism becomes locked, and the downward swing of the lever ceases. The parts now remain in this position, and a constant pressure is thus maintained on the contents of the receptacle.

To facilitate elevating the platform 12, lifting bars 26 are positioned beneath the same, said bars being operated by a system of toggle links 27 connected thereto, and actuated by a foot lever 28.

The longitudinal adjustment of the lever 9, and the vertical adjustment of the plunger 23 readily enables said parts to be set for adapting the mechanism to receptacles of different sizes.

I claim:

A presser device comprising a lever pivoted to swing vertically, a receptacle supporting member, suspension links by which said member is hung from the lever, abutments to the rear of the supporting member for preventing movement thereof in that direction, said member having rollers which engage the abutments, and the abutments having hooks at their upper ends to limit the upward travel of the rollers, and a plunger having a stem which is coupled to the lever at a point more remote from the fulcrum thereof than the connection between the lever and the aforesaid links, said plunger stem depending from the lever.

In testimony whereof I affix my signature.

IGNATZ GLANSCHNIG.